United States Patent [19]
Wellev et al.

[11] Patent Number: 5,487,362
[45] Date of Patent: Jan. 30, 1996

[54] COMBUSTION ENGINE OF THE PISTON ENGINE TYPE

[75] Inventors: Jens E. Wellev, Virum; Flemming Voergaard, Helsingør; Holger S. Andersen, Skibby, all of Denmark

[73] Assignee: Alex Jensen A/S, Skibby, Skibby, Denmark

[21] Appl. No.: 924,072

[22] PCT Filed: Mar. 15, 1991

[86] PCT No.: PCT/DK91/00079

§ 371 Date: Sep. 15, 1992

§ 102(e) Date: Sep. 15, 1992

[87] PCT Pub. No.: WO91/14086

PCT Pub. Date: Sep. 19, 1991

[30] Foreign Application Priority Data

Mar. 16, 1990 [DK] Denmark ................. 693/90

[51] Int. Cl.$^6$ ................. F02M 21/02
[52] U.S. Cl. ................. 123/27 GE; 123/526
[58] Field of Search ................. 123/27 GE, 526, 123/527

[56] References Cited

U.S. PATENT DOCUMENTS

| | | | |
|---|---|---|---|
| 3,144,857 | 8/1964 | Hesselberg | 123/27 R |
| 4,091,772 | 5/1978 | Heater et al. | 123/27 GE |
| 4,176,651 | 12/1979 | Backus | 123/27 GE |
| 4,499,885 | 2/1985 | Weissenbach et al. | 123/526 |
| 4,742,801 | 5/1988 | Kelgard | 123/27 GE |
| 4,798,184 | 1/1989 | Palko | 123/316 |
| 5,139,002 | 8/1992 | Lynch et al. | 123/DIG. 12 |

FOREIGN PATENT DOCUMENTS

| | | |
|---|---|---|
| 62726 | 9/1944 | Denmark . |
| 68361 | 1/1949 | Denmark . |
| 2619415 | 2/1989 | France . |
| 63651 | 8/1943 | U.S.S.R. . |
| 91451 | 3/1950 | U.S.S.R. . |

OTHER PUBLICATIONS

Russian language 1982 Russian Publication (partial translation).

*Primary Examiner*—Henry C. Yuen
*Assistant Examiner*—Erick Solis
*Attorney, Agent, or Firm*—Fitch, Even, Tabin & Flannery

[57] ABSTRACT

A combustion engine (1) of the piston engine type where the static compression ratio exceeds approximately 15:1, especially in the range of from approximately 15:1 to approximately 20:1, preferably approximately 17:1. The engine is provided with an ignition system (3) where the ignition point is situated after the top dead center (TDC), especially in the range of from approxmiately 0° TDC to approximately 20° TDC, preferably approximately 4° TDC. As a result, it is possible to achieve an ignition of a fuel, the spontaneous ignition capacity of which at the predetermined compression ratio does not usually suffize. The resulting ignition generates a maximum pressure in the cylinder of approximately 90° TDC, whereby a high efficiency of the fuel is obtained without simultaneously involving a steep increase in the temperature in the combustion chamber. A Venturi (71) for the combustion engine (1) according to the invention is substantially axially symmetrical when seen in the flow direction. The Venturi comprises a mixing chamber, an inlet side of an annular, slot-forming ring, an outlet side of the annular, slot-forming ring and a transition portion (77) to the inlet manifold (11).

9 Claims, 2 Drawing Sheets

COMBUSTION ENGINE OF THE PISTON ENGINE TYPE

TECHNICAL FIELD

The invention relates to a combustion engine of the piston engine type.

BACKGROUND ART

It is known to use Diesel engines, petrol engines and gas engines for running vehicles, ships and other power systems. All the engines are of the Otto engine type and are operated by an amount of air/fuel mixture being ignited in a combustion chamber whereafter the combustion causes an increase in pressure. The increase in pressure does not follow immediately after the ignition, but occurs gradually over a period of time. The ignition mechanism of the Diesel engine is spontaneous ignition optionally combined with a hot-bulb tube during the heating process where the combustible mixture is ignited due to the increase in pressure in the combustion chamber. The other two types of engine, viz. the petrol engine and the gas engine, are ignited by means of a spark from an ignition system. The latter two types of engines do not usually use spontaneous ignition, but if spontaneous ignition is nevertheless established, for instance in a petrol engine, it is accompanied by a disadvantageous effect, viz. the pinking or detonation. Gas engines for running vehicles are usually structured on the principles of petrol engines which are structured either directly for gas or can be converted thereto. A significant difference between the Diesel engine and the petrol engine is found in the compression ratio. The compression ratio for Diesel engines often exceeds 12:1 while the compression ratio for petrol engines seldom exceeds 10:1. The ignition point in the petrol engine is usually in the range of from approximately 12° to approximately 3° before the top dead center (TDC) with the result that the maximum pressure is not reached in the combustion chamber until after the top dead center (TDC).

DISCLOSURE OF INVENTION

The object of the invention is to provide a combustion engine of a high efficiency, and to allow a simple conversion of a Diesel engine into a gas engine, as well as to provide a simple way of increasing the power.

The combustion engine according to the invention is characterised in that the static compression ratio exceeds approximately 15:1, especially in the range of from approximately 15:1 to approximately 20:1, preferably approximately 17:1, and that the ignition point is situated after the top dead center (TDC), especially in the range of from approximately 0° ATDC to approximately 20° TDC, preferably approximately 4° ATDC. As a result, it is possible to achieve an ignition of a fuel, the spontaneous ignition capacity of which at the predetermined compression ratio does not usually suffize. The resulting ignition generates a maximum pressure in the cylinder of approximately 90° ATDC, whereby a high efficiency of the fuel is obtained without simultaneously involving a steep increase in the temperature in the combustion chamber.

An embodiment of the combustion engine according to the invention is such that the fuel includes liquid propane gas (LPG) in form of autogas mixed with air, where the LPG substantially includes propane and butane, and where the air is atmospheric air containing approximately 21% of oxygen. In this manner it is possible to increase the power of the combustion engine by using a conventional fuel of a high purity, where the combustion products are mainly carbon dioxide and water.

Another embodiment of the combustion engine according to the invention is characterised in that it is a six-cylinder engine of 9570 cm$^3$ with a bore of 125 mm and a stroke of 130 mm, and which is provided with an ignition system, such as of the type Lumenition, an evaporation system, such as of the type Renzo Matic, a carburetion system comprising a Venturi and a standard exhaust system for Diesel rigs. As a result it is possible at low expense to convert a known Diesel engine into a gas engine of a high efficiency.

The combustion engine according to the invention may furthermore be characterised in that the fuel injection system of a Diesel rig including pump, tubing and nozzle system is replaced by an ignition system comprising an ignition coil, a distributor, high tension leads and spark plugs. In this manner it is possible to use conventional, easily available components for the conversion.

The combustion engine according to the invention is further characterised in that the control of the fuel injection system of the Diesel rig is used for controlling the distributor of the ignition system, with the effect that a sufficiently accurate control of the ignition system is obtained simultaneously with a high efficiency.

An embodiment of the combustion engine according to the invention is characterised in that plugs, preferably of the sparking type, alternatively of the hot-bulb type, are inserted in the openings of a cylinder head which are used as fuel nozzles for Diesel. In this manner it is possible to increase the efficiency of a known engine, the engine being rather expensive to construct from scratch. It is possible to run the engine rather efficient with a power increase of more than approximately 10% and a reduced fuel consumption of more than approximately 10%, and reduced fuel costs of more than approximately 20%.

Another embodiment of the combustion engine according to the invention is characterised in that the ratio of the diameter D7 of the transition portion between the Venturi and the inlet manifold to the distance between the Venturi and the inlet manifold is between 1 to approximately 15 and 1 to approximately 5, preferably 1 to approximately 10, whereby a sufficiently good mixture of the fuel and the air is obtained.

A Venturi for a combustion engine according to the invention is characterised in that it is substantially axially symmetrical when seen in the flow direction and comprises a mixing chamber of the diameter D1, the inlet side of an annular slot-forming ring of the diameter D3, the outlet side of the annular, slot-forming ring of the diameter D5, and a transition portion of the diameter D7 to the inlet manifold, whereby a structure comprising very few parts is obtained.

An embodiment of the Venturi according to the invention is characterised in that the annular slot-forming ring and the transition portion connected to the inlet manifold together form a fuel-discharging nozzle device with the result that the air flow and the fuel flow present a very large contact surface immediately after the mixing process.

The Venturi is according to the invention advantageously such that the nozzle device is placed adjacent the periphery of the transition portion, and that a throttle is placed on the transition between the Venturi and the transition portion.

BRIEF DESCRIPTION OF THE DRAWINGS

The invention is described in greater detail below with reference to the accompanying drawings, in which.

BEST MODE FOR CARRYING OUT THE INVENTION

Figure 1:
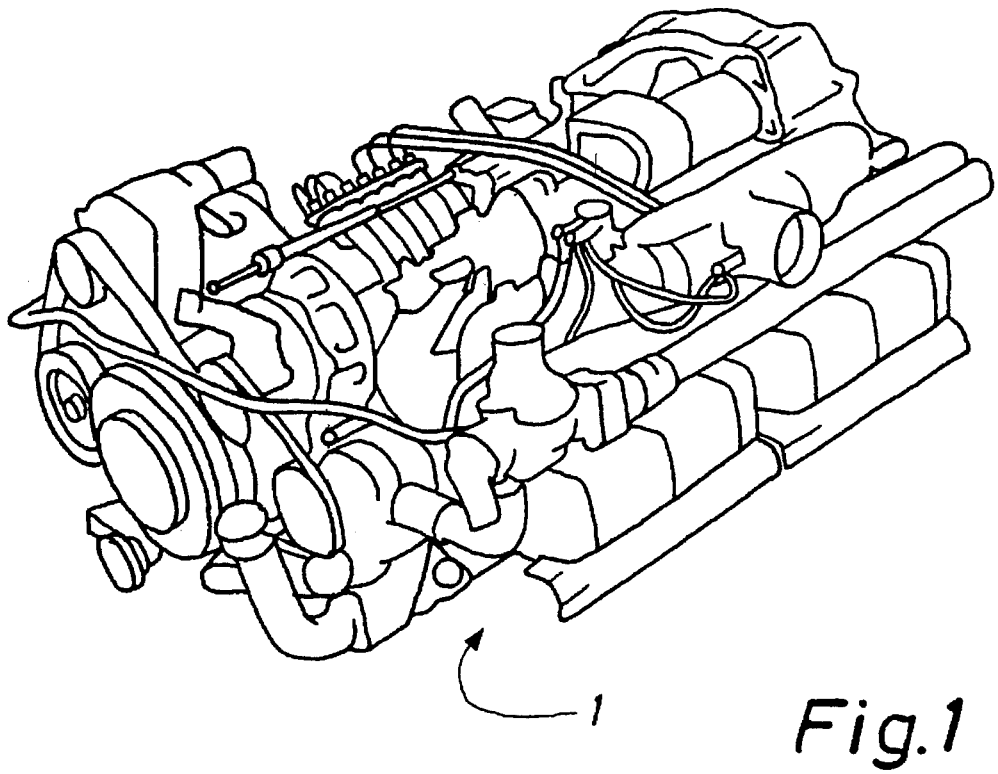
FIG. 1 illustrates a combustion engine according to the invention.

The invention has been tested on the engine of FIG. 1, said engine being designated the reference numeral 1. The engine is a Fiat type 8220.12 which is a Diesel engine usually used for lorries and the like vehicles. The engine is a six-cylinder, four-stroke Diesel engine usually generating 151 kW corresponding to 205 h.p. at 2600 r.p.m. The engine has a torque of 638 Nm corresponding to 65 kgm at 1600 r.p.m. The bore is 125 mm, the stroke 130 mm which results in a displacement of 9570 cm$^3$. The compression ratio has been set for Diesel running without hot-bult tubes, said ratio here being 17:1. The engine is usually provided with various peripheral equipment, such as a generator for charging batteries, a water pump and a blower for the cooling system. All the peripheral equipment can be maintained in connection with the conversion of the engine into an engine for gas. The transmission can also be maintained, i.e. the connection from the engine to the road, and it is not necessary either to alter the total gear ratio because the characteristic of the engine does not change significantly. It is, of course, possible to make the engine generate more power at a higher r.p.m., but simultaneously the wear and tear is increased and the transmission must accordingly be changed. A vital factor associated with the conversion of the Diesel engine into an engine for gas is that very few parts need to be replaced.

Figure 2:
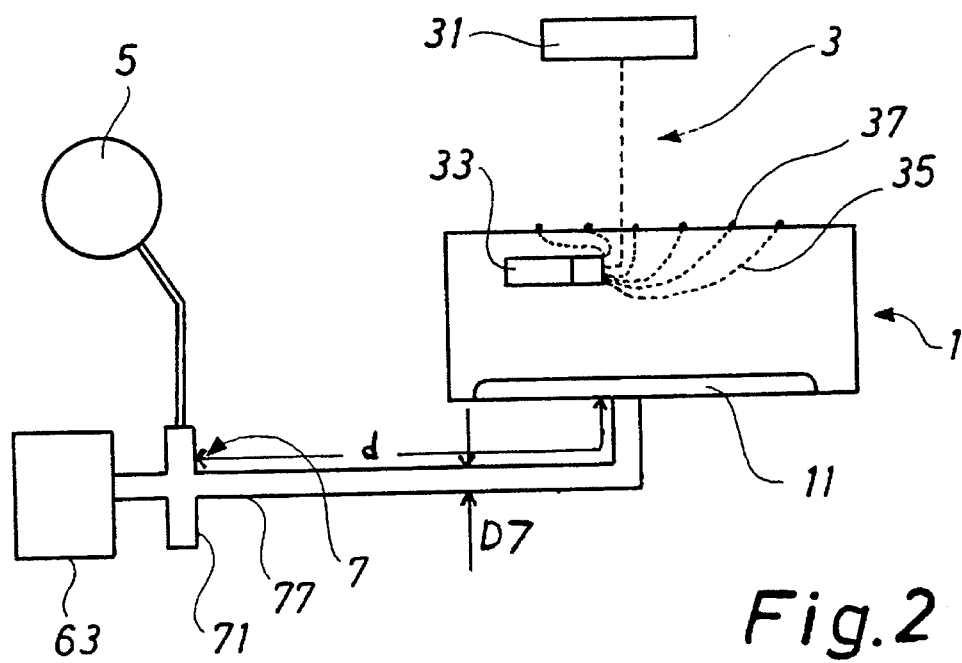
FIG. 2 is a diagrammatical view showing the principles of a conversion.

FIG. 2 illustrates the parts of the Diesel engine which in principle are replaced. The inlet and exhaust manifolds of the Diesel engine are maintained, but the inlet manifold 11 is connected to a carburetion device 7 connected through 53 to an evaporation system 5, such as of the type Renzo Matic. The evaporator 5 is connected to a gas tank replacing the Diesel oil tank in the vehicle. The gas tank is of a conventional type and suited for autogas or liquid propane gas.

The carburetion device is structured as follows:

The air enters through an air filter 63 and passes a Venturi 71 in which said air is mixed with the gas. Subsequently, the mixture of air and gas continues to the inlet manifold 11 through a transition portion 77. The transition portion comprises an approximately 50 cm long circular tube of an inner diameter D7 of 55 mm. The ignition system 3 of the engine 1 comprises an electronic ignition system, such as of the type Lumenition comprising an ignition coil 31, a distributor 33, and in the present embodiment six spark plugs 37 associated with suitable high tension leads 35. The electronic ignition system and the ignition coil 31 are of a conventional type allowing the usual adjustment possibilities. The distributor cover, the high tension leads 35 and the spark plugs 37 are also of a conventional type, but the base member of the distributor 33 has been designed especially for the engine 1 used. The base member must be connected to a shaft in the engine, said shaft rotating synchronously with the crankshaft. The shaft may for instance be a camshaft or a balance shaft. Diesel engines are usually associated with an external pumping system feeding Diesel oil to the nozzles of each combustion chamber. As such a pumping system is not necessary after the conversion, the distributor 33 can advantageously be connected to the engine 1 on this location. A further advantage of the location is that the shaft is moved synchronously with the crankshaft of the engine 1, said shaft previously driving the pumping system and now driving the distributor 33.

Figure 3:
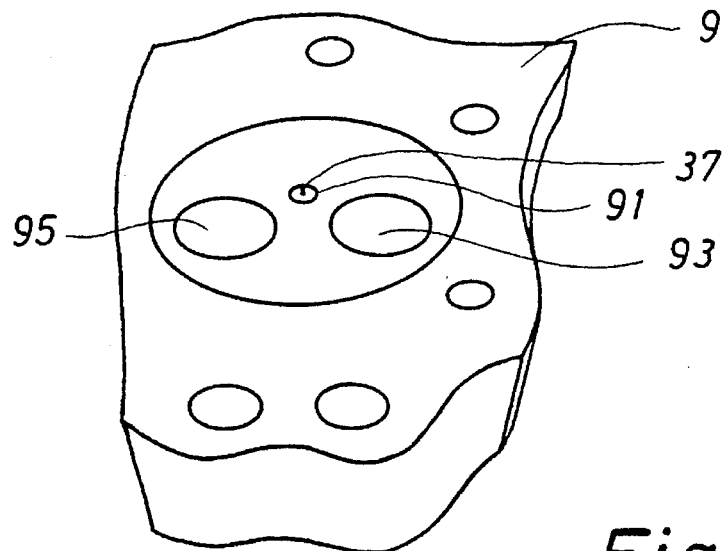
FIG. 3 is a sectional view of a converted cylinder head.

FIG. 3 is a sectional view of a cylinder head 9 of the engine 1 according to the invention, said view at the top showing the combustion chamber with the two valves, the inlet valve 93 and the exhaust valve 95. An injection nozzle is in connection with Diesel running placed betwen the above two valves. The injection nozzle has been replaced by a conventional spark plug 37. The replacement is allowed by providing a screwed connection in the opening 91 in the cylinder head 9 and in which the spark plug 37 can be inserted. The screwed connection can be such that the spark plug 37 is correctly positioned in the combustion chamber. Both the injection nozzle in the Diesel engine and the spark plug 37 in the gas engine are, theoretically speaking, placed on the same location in the combustion chamber, viz. on the location considered a geometrical center of the propagation of the pressure waves at the combustion. The above easy conversion is difficult in connection with engines where the fuel is not injected directly into the cylinder but instead sprayed on the inlet valve immediately before the air flow enters said cylinder, because the spark plug 37 must be placed in the combustion chamber. The injection nozzle is, however, usually placed in the combustion chamber of Diesel engines.

Figure 4:
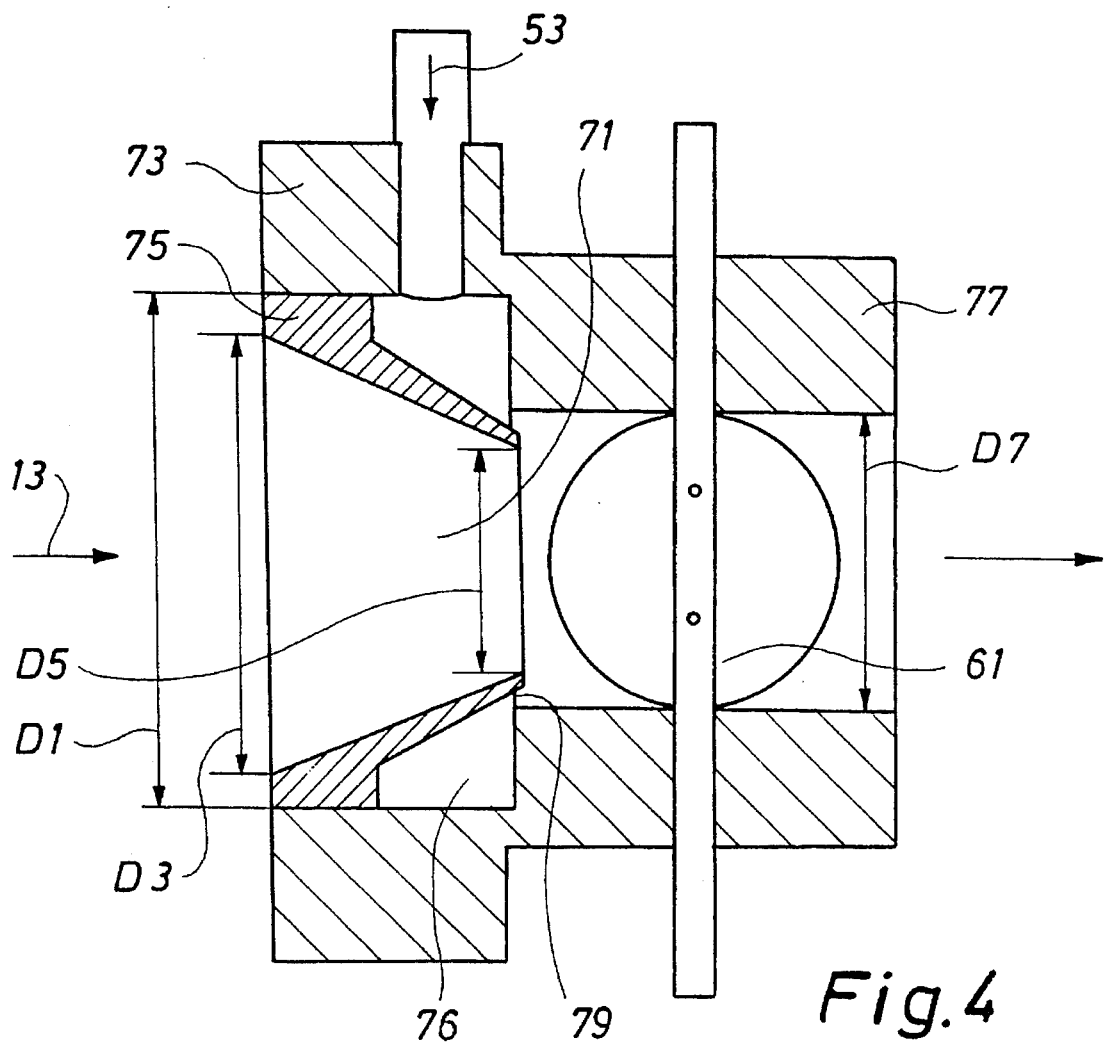
FIG. 4 illustrates the Venturi for the combustion engine according to the invention.

FIG. 4 illustrates the Venturi used in connection with the suction system for the gas engine.

The combustion engine 1 to be used for the conversion according to the invention must present a static compression ratio of more than approximately 15:1, especially in the range of from approximately 15:1 to approximately 20:1, preferably approximately 17:1. The ignition point of the spark plug 37 is situated after the top dead center (TDC). The ignition point is in the range of from approximately 0° ATDC to approximately 20° ATDC, preferably approximately 4° ATDC. The ignition point depends especially on the composition of the gas, but when liquid propane gas is used the ignition point is relatively unaltered.

The fuel to be used for the combustion engine 1 is usually liquid propane gas in form of autogas admixed air and where the liquid propane gas substantially contains propane and butane. The air is ordinary atmospheric air containing approximately 21% of oxygen. It is, however, also possible to use other gas compositions, but natural gas requires very solid tanks as well as a very low temperature in order to maintain the liquid state necessary on a vehicle for the sake of the space. Other types of storing tanks may be developed which allow the use of natural gas in vehicles. Town gas might also be used, but compared to the liquid propane gas the evaporated energy of said town gas is significantly lower.

The conversion of the combustion engine 1 includes the steps of providing the openings 91 of the cylinder head 9 with plugs 37, preferably of the sparking type, alternatively of the hot-bulb type, cf. FIG. 3, said openings previously being used for fuel nozzles for Diesel.

As far as the basic structure is concerned, the combustion engine 1 is a Diesel engine. The combustion engine 1 is provided with an ignition system 3, such as of the type Lumenition, an evaporation system 5, such as of the type Renzo Matic, and a carburetion device comprising a Venturi 71. The exhaust system previously used for Diesel running of the engine 1 can remain the same. The ignition system 3 and the evaporation system 5 can, of course, be of other types than the above. The ignition system 3 need not be an electronic ignition system, but may also be purely mechanical.

The fuel injection system of the Diesel engine including a pump, a tubing and a nozzle system is replaced by an ignition system 3 including an ignition coil 31, a distributor 33, high tension leads 35 and spark plugs 37.

The control, i.e. the driving shaft, controlling the fuel injection system of the Diesel engine is used for controlling the distributor 33 of the ignition system 3.

The Venturi 71 for the combustion engine 1 is illustrated in FIG. 4 and is substantially axially symmetrical when seen in the flow direction 13. The Venturi comprises a mixing chamber 73 of the diameter D1, where D1 corresponds to approximately 90 mm. Then the inlet side of an annular, slot-forming ring 75 is passed, said inlet side being of the diameter D3, where D3 is approximately 74 mm. Subsequently, the outlet side of the annular, slot-forming ring 75 is passed, said outlet side being of the diameter D5 which is approximately 45 mm. Finally, the transition portion 77 follows which is of the diameter D7, where D7 is approximately 55 mm. An annular slot 79 of a width of approximately 5 mm is formed between the annular, slotforming ring 75 at the outlet side and the transition portion 77. The width of the annular slot 79 can be adjusted by moving the annular, slot-forming ring 75 forwards and backwards relative to the transition portion 77. The movement of the annular, slot-forming ring 75 can for instance be allowed by said ring being screwed into the mixing chamber 73. An annular chamber 76 is provided between the wall of the mixing chamber 73 and the annular, slot-forming ring 75, said annular chamber assisting in distributing the gas before said gas leaves through the annular slot 79.

The ratio of the diameter of the transition portion 77, which diameter is indicated by reference character "D7" in FIG. 2, to the distance between the Venturi 71 and the inlet manifold 11, which distance is indicated by reference character "d" in FIG. 2, is between 1 to approximately 15 and 1 to approximately 5, preferably 1 to approximately 10. It is important that the transition portion 77 is sufficiently long in order to achieve a suitable mixture of air and gas. When the transition portion 77 is too short, the individual cylinders are fed with a differing mixture, i.e. either a too fat or a too lean mixture.

The annular, slot-forming ring 75 and the transition portion 77 connected to the inlet manifold 11 form together the fuel-feeding nozzle device or annular slot 79. Even though the fuel is fed adjacent a static surface and accordingly tends to be in the transition layer a suitable mixture can be obtained.

The nozzle device 79 is placed adjacent the periphery of the transition portion 77, and a throttle 51 is placed adjacent the transition between the Venturi 71 and the transition portion 77. The throttle 51 is activated in response to an ordinary activation of the speeder so as to adjust the power of the engine 1.

The invention is not restricted to the above embodiments, but may be modified in many ways without thereby deviating from the scope thereof. Thus more than one Venturi may be used, and the ignition system may include electrostatic ignition.

We claim:

1. A combustion engine of the piston engine type for running on a mixture of combustible gas and air comprising:
    at least one combustion chamber comprising a piston and having a static compression ratio in the range of 15:1 to 20:1;
    apparatus for producing a charge of the mixture of combustible gas and air in the combustion chamber; and
    a spark generating device in the combustion chamber for igniting the mixture of combustible gas and air at an ignition point situated in the range of 0° to 20° after top dead center of the piston in the combustion chamber.

2. A combustion engine as claimed in claim 1 wherein the combustible gas comprises liquefied natural gas (LNG).

3. A combustion engine as claimed in claim 1 wherein the combustible gas comprises town gas.

4. A combustion engine as claimed in claim 1 having an inlet manifold for receiving the mixture of combustible gas and air and the apparatus for producing a mixture of combustible gas and air in the combustion chamber comprises at least one inlet valve for each combustion chamber, the inlet valve being substantially the only entry for the mixture into the combustion chamber.

5. A combustion engine as claimed in claim 1, wherein the combustible gas comprises liquid propane gas (LPG) comprising propane and butane mixed with air, and where the air is atmospheric air containing approximately 21% of oxygen.

6. A combustion engine as claimed in claim 1 or 5, wherein the engine is a six-cylinder engine of approximately 9570 cm$^3$ with a bore of approximately 125 mm and a stroke of approximately 130 mm, and which is provided with an ignition system, an evaporation system, a carburetion system comprising a venturi and a standard exhaust system for diesel engines.

7. A combustion engine as claimed in claim 1 or 5, wherein the combustion engine is a converted diesel engine and a fuel injection system of the diesel engine including pump, tubing and nozzle system has been replaced by an ignition system comprising an ignition coil, a distributor, high tension leads and spark plugs to convert the engine from a diesel engine to a spark engine.

8. A combustion engine as claimed in claim 7, wherein the fuel injection system has control means and the control means of the fuel injection system of the diesel engine is used for controlling the distributor of the ignition system in the converted engine.

9. A combustion engine as claimed in claim 7, wherein the engine has a cylinder head with openings for use as fuel nozzles and spark generating plugs are inserted in the openings of the cylinder head to produce the converted engine.

* * * * *